6113X
W. Coffin,
Glass Furnace.
Patented Oct. 1, 1830.
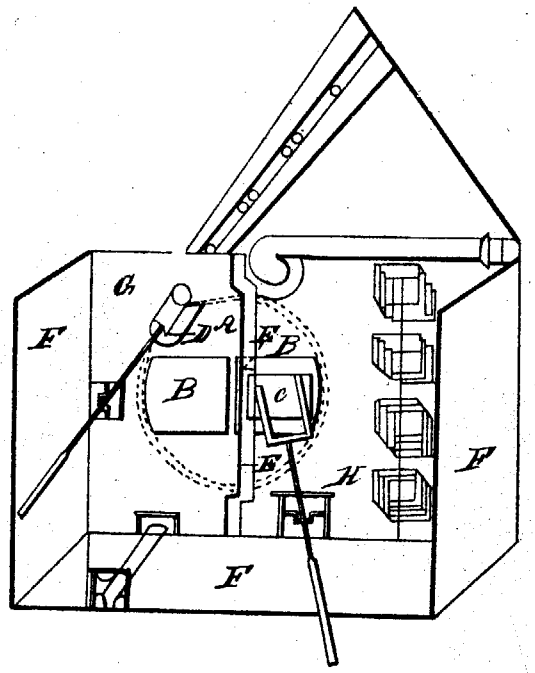

548 10/1/1830 6113X

William Coffin Junr.
Letters Patent. Dated October 1st 1830

The schedule referred to in these Letters Patent & making part of the same, containing a description in the words of the said William Coffin Jr himself of his improvement in the machine for flattening Cylinder Window glass.

---

Be it known that I William Coffin Jr. of Hammonton, in the County of Gloucester & State of New Jersey have invented a new & useful improvement in the machine for flattening Cylinder Window Glass, & that the following is a full & exact description of the construction & operation of the said machine as invented by me. The present mode of flattening glass is by having two stationary stones; one in the flattening oven on which the glass is flattened out from the cylinder form & then is passed by sliding over the surface of this stone on the other stationary stone, which is in the annealing or cooling oven, thro a small orrice under the partition wall which separates the two ovens, about half an inch above the surface of the two stones, which are joined together underneath this partition wall, & then the glass is raised up from the stone in the cooling oven after sufficiently cooled & stacked away.

What I claim as new & as my own invention or discovery to be made in the above described machine & for the use of which I ask an exclusive privilege is, that it consists in having a circular table or wheel, with the stones for flattening & cooling placed upon both sides, on the top, or to cover the whole surface & to carry the glass upon it when flattened by revolving horizontally upon its centre, to the cooling or annealing Oven, to be supported & worked by proper machinery for that purpose, instead of having the two Stones permanently fixed, one in each oven & the glass shoved or pushed over the surface of the stones from the one in the flattening oven, to the other in the cooling oven. That the centre of this horizontal wheel, or table, is to be under the partition wall which divides the two ovens; a distance above the top of the wheel or table, sufficient to pass the glass under, so that the glass placed upon & flattened on the Stone on the half of the wheel or table, in the flattening oven; may be carried around upon this table, which revolves on its centre, under the said wall to the cooling oven, without taking it from the stone until it arrives in the cooling oven, & then when sufficiently cool to be placed away, at the time the wheel or table, is stopped revolving, & the glass upon it is cooling & taken off in the cooling oven, after having been conveyed upon it from the flattening oven another cylinder can be flattened on the stone on the other half of the wheel or table that has passed by its revolution from the cooling to the flattening oven.

By this operation it does not require that the glass should be removed from the stone upon which it is flattened, which preserves the polish, & prevents the surface of the glass from being scratched, which is the case by being pushed over the surface of the stones, from the one to the other.

It also differs from the other mode in this, that by the revolving of this wheel or table, the stones are both made flattening & both cooling stones, or the whole wheel or table is both a flattening & cooling stone.

William Coffin jr

Witnesses { Wm. T. Dean
{ A. Pettit

Received and Recorded anew March 9th 1841

Exd 918 (6 84 [illegible])